(12) United States Patent  
Bai

(10) Patent No.: US 7,801,654 B2  
(45) Date of Patent: Sep. 21, 2010

(54) ADAPTIVE INTEGRATED POWERTRAIN CONTROL

(75) Inventor: Shushan Bai, Ann Arbor, MI (US)

(73) Assignee: GM Global Technology Operations, Inc.

( * ) Notice: Subject to any disclaimer, the term of this patent is extended or adjusted under 35 U.S.C. 154(b) by 802 days.

(21) Appl. No.: 11/747,425

(22) Filed: May 11, 2007

(65) Prior Publication Data

US 2008/0281494 A1    Nov. 13, 2008

(51) Int. Cl.
*B60K 31/00*    (2006.01)
*G06F 19/00*    (2006.01)

(52) U.S. Cl. .............. 701/54; 701/56; 701/95
(58) Field of Classification Search .......... 701/54, 701/55, 56, 87, 95; 477/5, 37, 42, 62
See application file for complete search history.

(56) References Cited

U.S. PATENT DOCUMENTS 6,190,283 B1 *   2/2001   Uchida .................. 477/5
6,449,547 B1 *   9/2002   Kurihara ................ 701/56
6,482,122 B2 *   11/2002  Ochiai et al. ............ 477/42

FOREIGN PATENT DOCUMENTS

DE    2811574 A1    9/1979
DE    19933010 A1   1/2000

* cited by examiner

*Primary Examiner*—Tan Q Nguyen

(57) ABSTRACT

A powertrain controller for a vehicle comprises a vehicle load estimation module, an adaptive power demand module, a throttle map module, and a transmission gearshift map module. The adaptive power demand module selects one of N mappings from pedal position to power demand based upon a vehicle load index and determines a power demand signal based upon a received pedal position signal and the selected one of the N mappings. The throttle map module selects one of P mappings from speed to throttle control based upon the power demand signal and determines a throttle control signal based upon a received speed signal and the selected one of the P mappings. The transmission gearshift map module selects one of Q mappings from vehicle speed to gear selection based upon the power demand signal and determines a gear control signal based upon a received vehicle speed signal and the selected one of the Q mappings.

18 Claims, 4 Drawing Sheets

ADAPTIVE INTEGRATED POWERTRAIN CONTROL

FIELD

The present disclosure relates to powertrain control in a vehicle, and more specifically to gear selection for an automatic transmission and throttle control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 according to the prior art is depicted. A powertrain controller 102 receives signals from vehicle sensors 104, such as pedal position sensors and vehicle speed sensors. Based on these signals, the powertrain controller 102 communicates a control signal to a transmission 106 indicating which gear to select. The powertrain controller 102 communicates signals to an engine 108 indicating fuel and spark parameters. The powertrain controller 102 communicates a control signal to an electronic throttle control (ETC) motor 110, which varies the position of a throttle valve modulating air intake of the engine 108.

SUMMARY

A powertrain controller for a vehicle comprises a vehicle load estimation module, an adaptive power demand module, a throttle map module, and a transmission gearshift map module. The vehicle load estimation module generates a vehicle load index. The adaptive power demand module selects one of N mappings from pedal position to power demand based upon the vehicle load index and determines a power demand signal based upon a received pedal position signal and the selected one of the N mappings.

The throttle map module selects one of P mappings from speed to throttle control based upon the power demand signal and determines a throttle control signal based upon a received speed signal and the selected one of the P mappings. The transmission gearshift map module selects one of Q mappings from vehicle speed to gear selection based upon the power demand signal and determines a gear control signal based upon a received vehicle speed signal and the selected one of the Q mappings. N, P, and Q are integers greater than one.

In other features, the adaptive power demand module selects another one of the N mappings based upon the vehicle load index and determines the power demand signal based upon the pedal position signal and an interpolation of the selected one of the N mappings and the selected another one of the N mappings. The throttle map module selects another one of the P mappings based upon the power demand signal and determines the throttle control signal based upon the speed signal and an interpolation of the selected one of the P mappings and the selected another one of the P mappings.

In further features, the transmission gearshift map module selects another one of the Q mappings based upon the power demand signal and determines the gear control signal based upon the vehicle speed signal and an interpolation of the selected one of the Q mappings and the selected another one of the Q mappings. The speed signal comprises a transmission speed signal. The speed signal comprises the vehicle speed signal. The throttle map module includes S sets of N mappings from vehicle speed to throttle control, selects one of the S sets of N mappings based upon the gear control signal, and selects one of the N mappings from the selected one of the S sets of N mappings based upon the power demand signal.

In still other features, the vehicle load estimation module generates the vehicle load index based upon at least one of incline, amount of towing load, wind resistance, payload, speed, altitude, and acceleration. The vehicle load estimation module generates the vehicle load index based upon a difference between measured acceleration of the vehicle and acceleration of the vehicle as predicted by engine torque. The pedal position signal is based upon a signal from an accelerator pedal of the vehicle.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
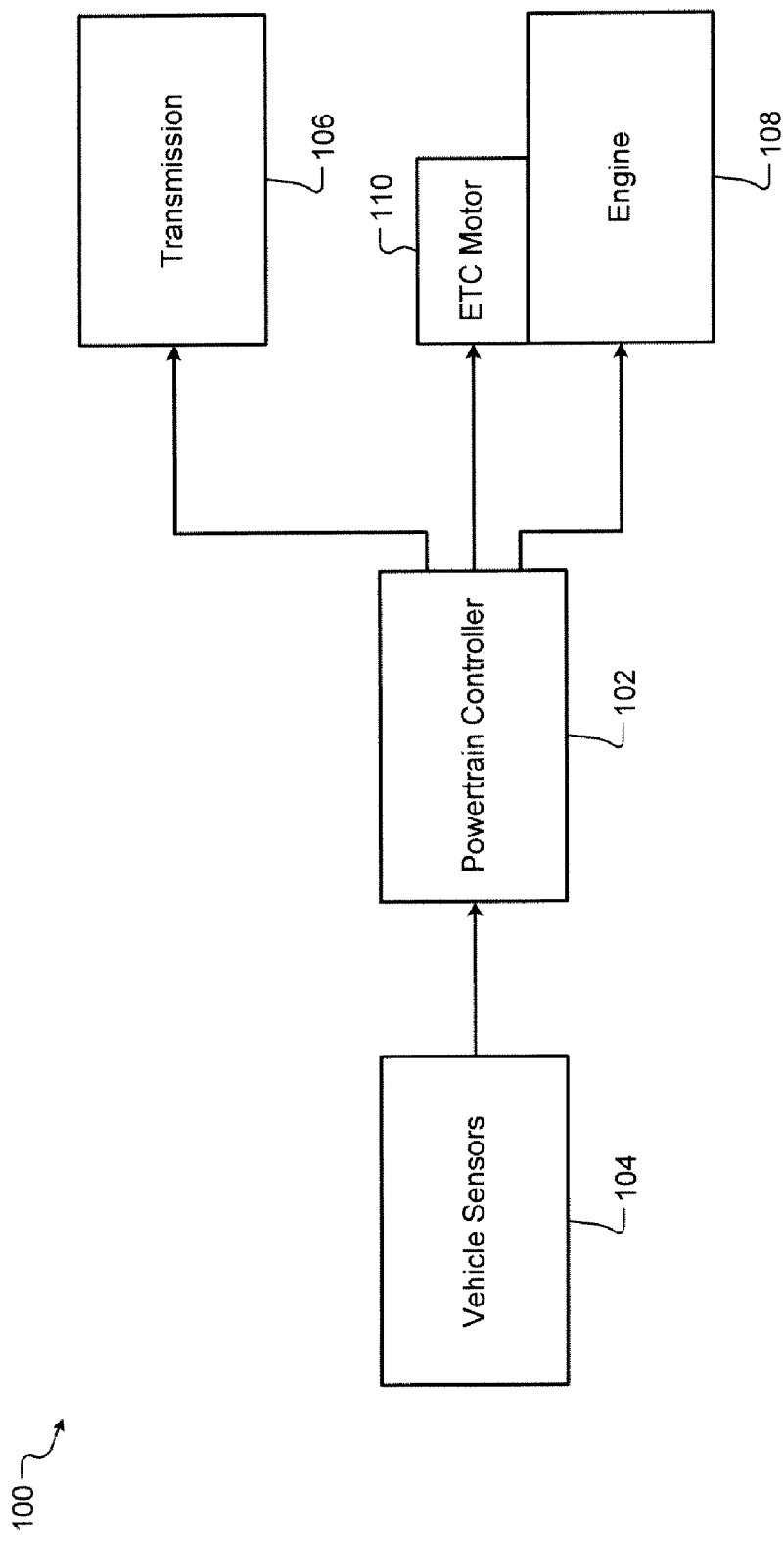
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
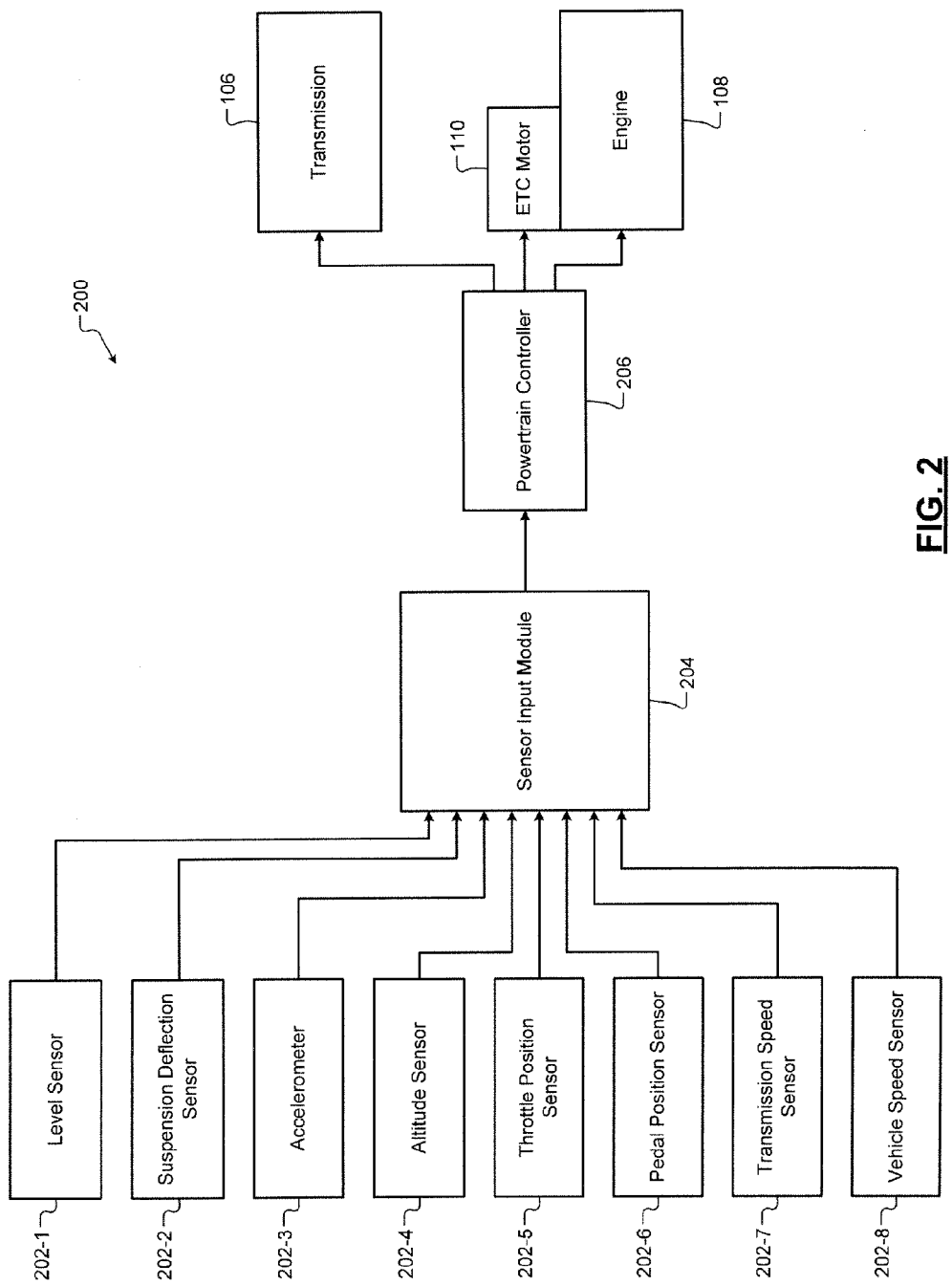
FIG. 2 is a functional block diagram of an exemplary engine system according to the principles of the present disclosure.

Referring now to FIG. 2, a functional block diagram of an exemplary engine system 200 according to the principles of the present disclosure is presented. The engine system 200 includes a plurality of sensors 202, such as a level sensor 202-1, a suspension deflection sensor 202-2, an accelerometer 202-3, and an altitude sensor 202-4. The sensors 202 may also include a throttle position sensor 202-5, a pedal position sensor 202-6, a transmission speed sensor 202-7, and a vehicle speed sensor 202-8.

Signals from the sensors 202 are received by a sensor input module 204. The sensor input module 204 may latch signals at specified times, convert analog signals to digital, and perform bounds checking on the signal values. A powertrain controller 206 receives sensor signals from the sensor input module 204. Based upon the sensor signals, the powertrain controller 206 communicates a gear selection signal to the transmission 106, a throttle position control signal to the electronic throttle control (ETC) motor 110, and spark and fuel control signals to the engine 108.

Figure 3:
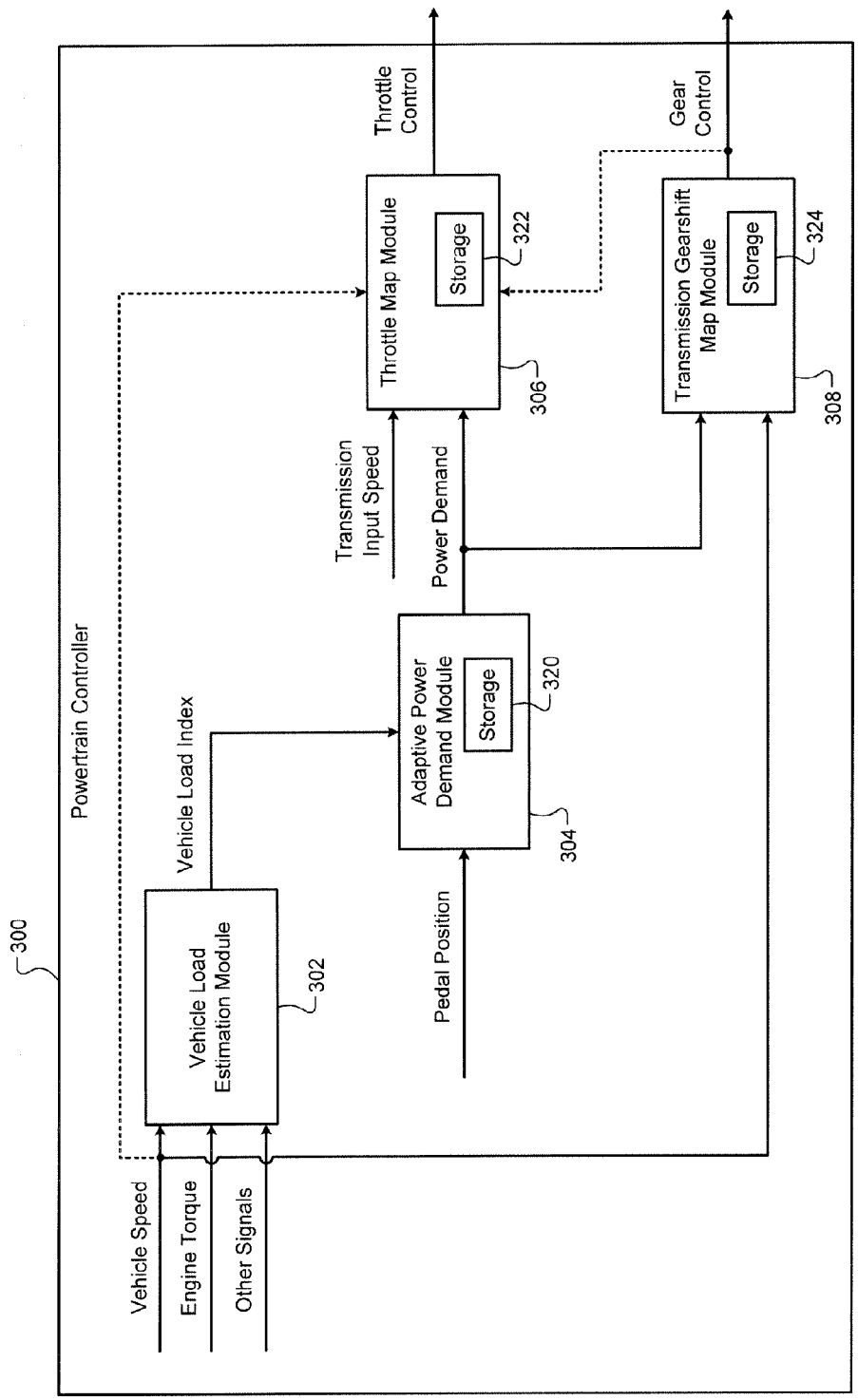
FIG. 3 is a functional block diagram of an exemplary powertrain controller according to the principles of the present disclosure.

Referring now to FIG. 3, a functional block diagram of an exemplary powertrain controller 300 according to the principles of the present disclosure is presented. The powertrain controller 300 includes a vehicle load estimation module 302, an adaptive power demand module 304, a throttle map module 306, and a transmission gearshift map module 308.

The vehicle load estimation module 302 receives engine torque signals, vehicle speed signals, and/or other signals. Based upon these signals, the vehicle load estimation module 302 generates a vehicle load index, which is communicated to the adaptive power demand module 304. The vehicle load index is a measure of the load the vehicle is experiencing.

The load may be affected by the incline the vehicle is traveling on, the weight of the vehicle, whether the vehicle is towing, wind resistance, etc. The vehicle load estimation module 302 can use sensor signals from the sensor input module 204 of FIG. 2 to determine a vehicle load index. The vehicle load estimation module 302 may estimate wind resistance based upon vehicle speed and may estimate angle of incline based on the measured angle of a sensor attached to the vehicle.

The vehicle load estimation module 302 may estimate payload of the vehicle from suspension deflection sensors, may estimate altitude from an air pressure sensor, and may estimate vehicle acceleration from an accelerometer or a transmission speed reading. In various implementations, the vehicle load estimation module 302 may determine or adjust the vehicle load index based upon the difference between actual vehicle acceleration and acceleration predicted by current engine torque. Further description of the vehicle load estimation module 302 may be found in commonly assigned U.S. Ser. No. 11/459,703, filed Jul. 25, 2006, the disclosure of which is hereby incorporated by reference in its entirety.

The adaptive power demand module 304 includes storage 320 that stores one or more tables of power demand versus pedal position. Pedal position may be determined from signals from a pedal position sensor. Pedal position information may be modified by such sources as cruise control and traction control. A table is selected from storage 320 by the vehicle load index from the vehicle load estimation module 302.

Values may be interpolated if the vehicle load index lies between multiple tables. For example, in various implementations storage 320 includes four tables and the vehicle load index ranges from one to four. In this case, if a vehicle load index of 2.3 is received, the adaptive power demand module 304 may read power demand values from tables corresponding to vehicle load indices of two and three.

The adaptive power demand module 304 may then interpolate between the two power demand values using a straight line. A straight line interpolation for the above example would be to add thirty percent of the difference between a value from tables two and three to the value from table two. A non-linear curve or best fit line may be employed if power demand values from additional tables are included. The resulting power demand value is communicated to the throttle map module 306 and to the transmission gearshift map module 308.

The throttle map module 306 includes storage 322 that stores one or more tables corresponding to a plot of throttle position versus transmission speed. In various implementations, storage 322 may store functions that embody the relationship between throttle position and transmission speed instead of storing pre-calculated tables. The throttle map module 306 selects one of the tables based upon the power demand signal from the adaptive power demand module 304.

The throttle map module 306 may interpolate when the power demand signal falls between two tables within storage 322. The throttle map module 306 determines a throttle position control signal from the selected table or tables based on transmission input speed. The throttle map module 306 communicates the throttle position control signal to the ETC motor 110 of FIG. 2.

If the throttle map module 306 receives vehicle speed instead of transmission speed, the throttle map module may include a plurality of sets of tables, each corresponding to a different gear or gear ratio. A gear signal may be received from the transmission gearshift map module 308 to select one of the sets of tables; no interpolation is necessary because the gear signal will be an integer. The transmission gearshift map module 308 includes storage 324 that stores one or more tables containing a mapping from vehicle speed to a gear control signal.

The transmission gearshift map module 308 selects a table from storage 324 based upon the received power demand signal. The transmission gearshift map module 308 may interpolate If the power demand signal falls between two tables. Based upon the vehicle speed, the transmission gearshift map module 308 will output a gear control signal to the transmission 106 of FIG. 2. The gear control signal may also be communicated to the throttle map module 306.

Figure 4:
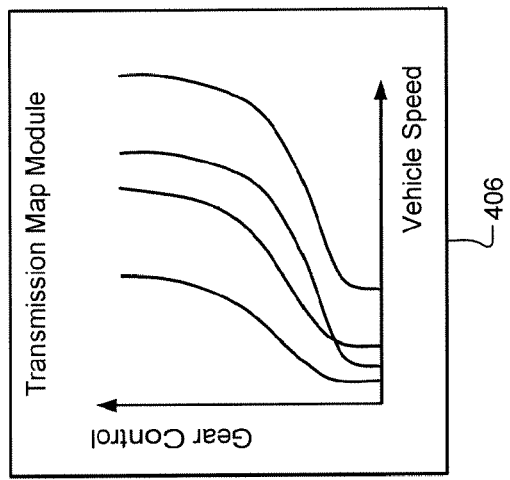
FIG. 4 contains graphical representations of exemplary input/output relationships.
Figure 4:
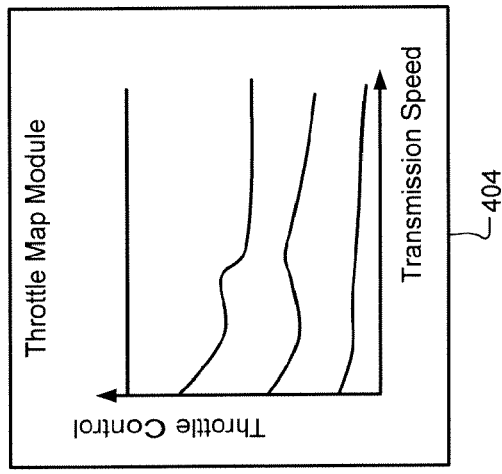
Figure 4:
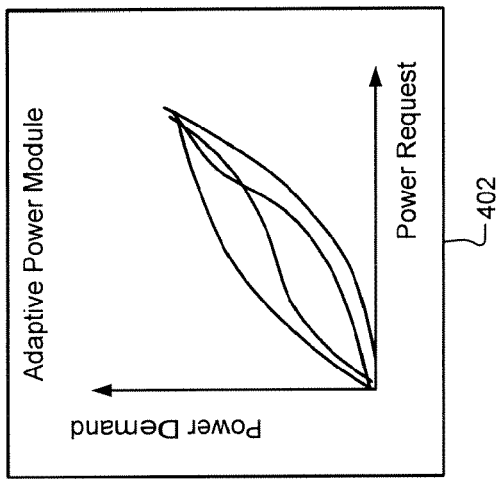

Referring now to FIG. 4, graphical representations of exemplary input/output relationships stored in equation and/or tabular form by storage 320, storage 322, and/or storage 324 are presented. A first chart 402 depicts exemplary mappings from pedal position (such as pedal position) to power demand for an adaptive power demand module, such as the adaptive power demand module 304 of FIG. 3. In the first chart 402, four mappings are shown, corresponding to four different vehicle load indices.

A second chart 404 depicts exemplary mappings from transmission speed to throttle position for a throttle map module, such as the throttle map module 306 of FIG. 3. The second chart 404 includes four mappings, corresponding to four different power demand signals. A third chart 406 depicts exemplary mappings from vehicle speed to gear control for a transmission gearshift map module, such as the transmission gearshift map module 308 of FIG. 3.

The third chart 406 includes four mappings, corresponding to four values of the power demand signal. These input/output relationships may be established during design of the engine, and may be modified during calibration. Additionally, the input/output relationships may be modified by the powertrain controller 300 while driving to improve fuel economy.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A powertrain controller for a vehicle, comprising:
    a vehicle load estimation module that generates a vehicle load index;
    an adaptive power demand module that includes N mappings from pedal position to power demand, that selects one of the N mappings based upon the vehicle load index, and that determines a power demand signal based upon a received pedal position signal and the selected one of the N mappings, wherein N is an integer greater than one;
    a throttle map module that includes P mappings from speed to throttle control, that selects one of the P mappings based upon the power demand signal, and that determines a throttle control signal based upon a received speed signal and the selected one of the P mappings, wherein P is an integer greater than one; and
    a transmission gearshift map module that includes Q mappings from vehicle speed to gear selection, that selects one of the Q mappings based upon the power demand signal, and that determines a gear control signal based upon a received vehicle speed signal and the selected one of the Q mappings, wherein Q is an integer greater than one.

2. The powertrain controller of claim 1 wherein the adaptive power demand module selects another one of the N mappings based upon the vehicle load index and determines the power demand signal based upon the pedal position signal and an interpolation of the selected one of the N mappings and the selected another one of the N mappings.

3. The powertrain controller of claim 1 wherein the throttle map module selects another one of the P mappings based upon the power demand signal and determines the throttle control signal based upon the speed signal and an interpolation of the selected one of the P mappings and the selected another one of the P mappings.

4. The powertrain controller of claim 1 wherein the transmission gearshift map module selects another one of the Q mappings based upon the power demand signal and determines the gear control signal based upon the vehicle speed signal and an interpolation of the selected one of the Q mappings and the selected another one of the Q mappings.

5. The powertrain controller of claim 1 wherein the speed signal comprises a transmission speed signal.

6. The powertrain controller of claim 1 wherein the speed signal comprises the vehicle speed signal and wherein the throttle map module includes S sets of N mappings from vehicle speed to throttle control, selects one of the S sets of N mappings based upon the gear control signal, and selects one of the N mappings from the selected one of the S sets of N mappings based upon the power demand signal.

7. The powertrain controller of claim 1 wherein the vehicle load estimation module generates the vehicle load index based upon at least one of incline, amount of towing load, wind resistance, payload, speed, altitude, and acceleration.

8. The powertrain controller of claim 7 wherein the vehicle load estimation module generates the vehicle load index based upon a difference between measured acceleration of the vehicle and acceleration of the vehicle as predicted by engine torque.

9. The powertrain controller of claim 1 wherein the pedal position signal is based upon a signal from an accelerator pedal of the vehicle.

10. A method comprising:
    generating a vehicle load index for a vehicle;
    selecting one of N mappings from pedal position to power demand based upon the vehicle load index, wherein N is an integer greater than one;
    receiving a pedal position signal, a speed signal, and a vehicle speed signal;
    determining a power demand signal based upon the pedal position signal and the selected one of the N mappings;
    selecting one of P mappings from speed to throttle control based upon the power demand signal, wherein P is an integer greater than one;
    determining a throttle control signal based upon the speed signal and the selected one of the P mappings;
    selecting one of Q mappings from vehicle speed to gear selection based upon the power demand signal, wherein Q is an integer greater than one; and
    determining a gear control signal based upon the vehicle speed signal and the selected one of the Q mappings.

11. The method of claim 10 further comprising:
    selecting another one of the N mappings based upon the vehicle load index;
    interpolating between the selected one of the N mappings and the selected another one of the N mappings; and
    determining the power demand signal based upon the pedal position signal and a result of the interpolating.

12. The method of claim 10 further comprising:
    selecting another one of the P mappings based upon the power demand signal;
    interpolating between the selected one of the P mappings and the selected another one of the P mappings; and
    determining the throttle control signal based upon the speed signal and a result of the interpolating.

13. The method of claim 10 further comprising:
    selecting another one of the Q mappings based upon the power demand signal;
    interpolating between the selected one of the Q mappings and the selected another one of the Q mappings; and
    determining the gear control signal based upon the vehicle speed signal and a result of the interpolating.

14. The method of claim 10 wherein the speed signal comprises a transmission speed signal.

15. The method of claim 10 wherein the speed signal comprises the vehicle speed signal and further comprising:
    selecting one of S sets of N mappings from vehicle speed to throttle control based upon the gear control signal; and
    selecting one of the N mappings from the selected one of the S sets of N mappings based upon the power demand signal.

16. The method of claim 10 further comprising generating the vehicle load index based upon at least one of incline, amount of towing load, wind resistance, payload, speed, altitude, and acceleration.

17. The method of claim 16 further comprising generating the vehicle load index based upon a difference between measured acceleration of the vehicle and acceleration of the vehicle as predicted by engine torque.

18. The method of claim 10 wherein the pedal position signal is based upon a signal from an accelerator pedal of the vehicle.

* * * * *